(No Model.)
H. W. DIEK.
LIGHT FOR CHRISTMAS TREES.
No. 484,304.   Patented Oct. 11, 1892.
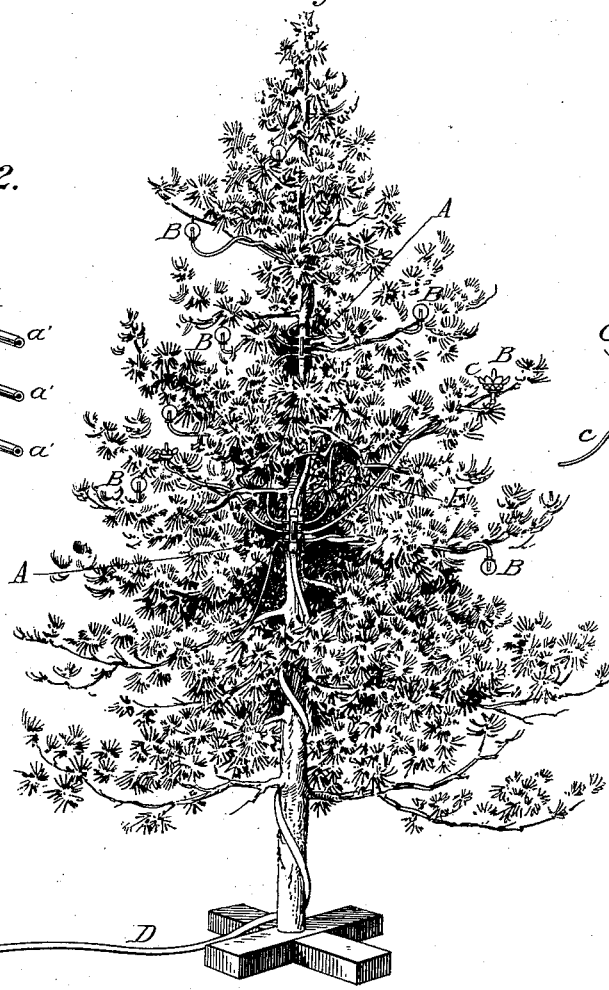
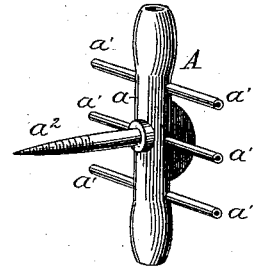
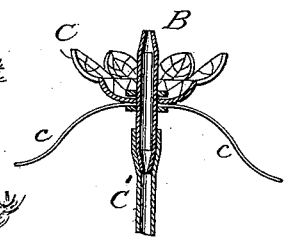
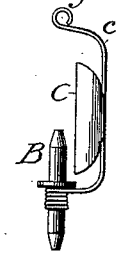
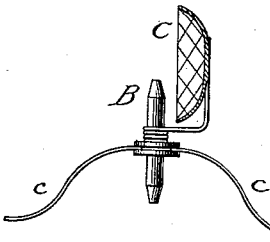
WITNESSES:
Raymond F. Barnes
W. R. Kennedy
INVENTOR
H. W. Diek
BY
Phil. T. Dodge
ATTORNEY.

UNITED STATES PATENT OFFICE.

HENRY W. DIEK, OF BALTIMORE, MARYLAND.

LIGHT FOR CHRISTMAS-TREES.

SPECIFICATION forming part of Letters Patent No. 484,304, dated October 11, 1892.

Application filed September 29, 1891. Serial No. 407,141. (No model.)

*To all whom it may concern:*

Be it known that I, HENRY W. DIEK, of Baltimore, in the State of Maryland, have invented a new and useful Improvement in Lights for Christmas-Trees, of which the following is a specification.

The aim of my invention is to provide for the cheap, safe, attractive, and uniform illumination of Christmas-trees by gas-jets; and to this end it consists in a novel construction of burners and distributing devices whereby gas received through a single supply-pipe may be delivered to burners distributed about the tree at the fancy of the decorator.

In the accompanying drawings, Figure 1 is a view of a tree provided with my illuminating devices. Fig. 2 is a perspective view of one of the distributers. Fig. 3 is a sectional view of one of the burners. Figs. 4 and 5 are views illustrating different forms of burner and reflector.

In order to secure a practical and effective illumination by a series of burners, it is necessary not only that they shall be adapted for attachment to the limbs of the tree and be connected with the source of supply by flexible pipes and that they be placed according to fancy, but also that the delivery of gas to the different burners shall be equalized, and this without the employment of cocks or other expensive devices. I therefore provide for each tree one or more metal distributers, adapted for attachment to the tree and connection with the supply-tube and each having a series of small branch pipes, from which small flexible tubes are extended, and each provided with a burner so constructed as to properly check the discharge of gas therefrom.

In the drawings, A A represent the distributers, each cast or otherwise formed with a tubular body $a$ and with a number of relatively-small tubes or branches $a'$, leading therefrom. The body is also provided with a screw $a^2$ or other means by which it may be readily and securely attached to a tree.

B B represent the gas-burners, each consisting of a small metal tube tapered down or reduced in diameter at the lower end, so that the gas entering the restricted opening may expand in the interior and before reaching the delivery-orifice, in order to prevent it from blowing out violently and producing a long flame. Each burner is preferably provided with a surrounding ornamental reflector C, cast from white metal, after the manner of what are known in the market as "brilliants," or otherwise formed from any bright material—for example, as shown in Figs. 4 and 5. Each burner is provided with pliable arms $c$ or other fastening devices adapted for attachment to the tree and is inserted in the end of a small tube C', of rubber or other pliable material, and each of these tubes is connected separately with one of the small tubes or branches of the distributer A. The distributer is connected to a large supply-pipe D, preferably of rubber, attached to any source of gas-supply. If the number of burners demanded is greater than the number of branches on a single distributer, two or more distributers will be connected by pipes E, as shown, in order to equalize the distribution. The upper distributer will have its upper end closed by a cork or otherwise.

In making use of the device the distributers are fixed to the body of the tree, the branch tubes extended along and around the limbs, and the burners fixed in place, as fancy may dictate, after which the main tube is connected with a source of supply. The gas issuing from the burners will produce small and substantially-uniform flames and, in connection with the reflectors, will produce a very brilliant and pleasing effect.

Having thus described my invention, what I claim is—

1. A gas-lighting system for Christmas-trees and gardens, consisting of a main supply-tube, a distributer arranged to be connected therewith, provided with means for attachment to a tree, and having a series of branch tubes, pliable pipes attached to said tubes and adapted to extend along the limbs of the tree, burners applied to the ends of the last-named tubes, and means for securing the burners in place.

2. In a tree-lighting device, the combination, with a gas-distributer provided with means for attachment to the tree, of branch tubes leading therefrom and adapted to extend along the limbs of the tree, burners applied to said branch tubes, and means for securing the burners in place.

3. In a device for lighting Christmas-trees, the distributer-tube consisting of the main tube adapted to be connected with the source of gas-supply and provided with the series of branch tubes communicating with the main tube and projecting therefrom, in combination with the screw connected to said distributer-tube and adapted to enter the tree to hold the same in place.

In testimony whereof I hereunto set my hand, this 17th day of September, 1891, in the presence of two attesting witnesses.

HENRY W. DIEK.

Witnesses:
FABIUS S. ELMORE,
RAYMONA F. BARNES.